(12) United States Patent
Yoshida et al.

(10) Patent No.: US 8,445,153 B2
(45) Date of Patent: May 21, 2013

(54) FUEL CELL HIGH-POTENTIAL PREVENTION CONTROL SYSTEM

(75) Inventors: Michio Yoshida, Nishikamo-gun (JP); Kenji Umayahara, Nishikamo-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 459 days.

(21) Appl. No.: 12/740,745

(22) PCT Filed: Oct. 29, 2008

(86) PCT No.: PCT/JP2008/069595
§ 371 (c)(1),
(2), (4) Date: Apr. 30, 2010

(87) PCT Pub. No.: WO2009/057616
PCT Pub. Date: May 7, 2009

(65) Prior Publication Data
US 2010/0316921 A1    Dec. 16, 2010

(30) Foreign Application Priority Data

Nov. 2, 2007 (JP) .................................. 2007-286114

(51) Int. Cl.
*H01M 8/04* (2006.01)
(52) U.S. Cl.
USPC ............................. 429/432; 429/428; 429/430
(58) Field of Classification Search
None
See application file for complete search history.

(56) References Cited

U.S. PATENT DOCUMENTS
2003/0118876 A1* 6/2003 Sugiura et al. ................... 429/9

FOREIGN PATENT DOCUMENTS

| | | |
|---|---|---|
| JP | 61-284065 A | 12/1986 |
| JP | 06-042181 A | 6/1994 |
| JP | 2002-141091 A | 5/2002 |
| JP | 2003-504807 A | 2/2003 |
| JP | 2005-251674 A | 9/2005 |
| JP | 2006-020468 A | 1/2006 |
| JP | 2007-109569 A | 4/2007 |
| JP | 2008-218398 A | 9/2008 |
| WO | WO02/15316 A1 | 2/2002 |
| WO | WO 2007/064317 * | 6/2007 |

* cited by examiner

*Primary Examiner* — Barbara Gilliam
*Assistant Examiner* — Kwang Han
(74) *Attorney, Agent, or Firm* — Kenyon & Kenyon LLP

(57) ABSTRACT

A fuel cell system capable of providing a suitable power distribution is provided. A fuel cell system includes: a fuel cell that generates electric power through an electrochemical reaction between a fuel gas and an oxidant gas; a motor that can be driven upon the supply of electric power and can generate regenerative power; a power storage unit which can be charged with power generated from the fuel cell and regenerative power of the motor and can discharge charge power to the motor; an auxiliary apparatus used for operating at least the fuel cell; and a control unit that controls a power distribution between the above components. The control unit determines the power distribution using a power generation command value based on power required to be generated during a normal operation, while the control unit determines the power distribution using a power generation measured value of the fuel cell instead of the power generation command value during a high-potential prevention control that avoids a voltage of the fuel cell becoming equal to or higher than a predetermined high-potential prevention voltage threshold lower than an open circuit voltage of the fuel cell.

3 Claims, 2 Drawing Sheets

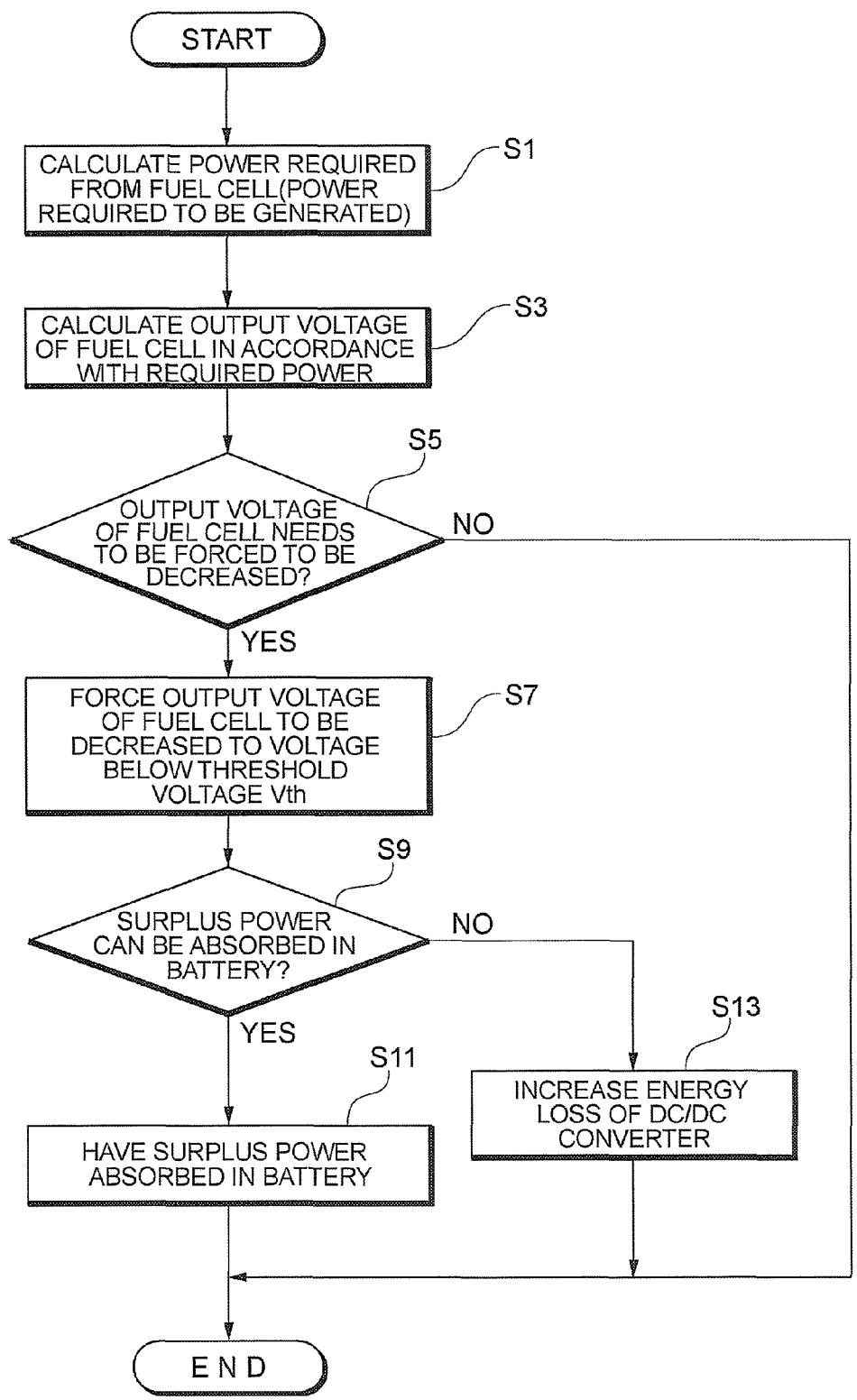

FUEL CELL HIGH-POTENTIAL PREVENTION CONTROL SYSTEM

This is a 371 national phase application of PCT/JP2008/069595 filed 29 Oct. 2008, which claims priority to Japanese Patent Application No. 2007-286114 filed 2 Nov. 2007, the contents of which are incorporated herein by reference.

TECHNICAL FIELD

The present invention relates to a fuel cell system, and particularly relates to a fuel cell system provided with a motor that can be driven upon the supply of electric power and can generate regenerative power.

BACKGROUND ART

In recent years, fuel cell systems which employ, as an energy source, a fuel cell that generates electric power through an electrochemical reaction between a fuel gas and an oxidant gas have been attracting attention. In the fuel cell systems, while a high-pressure fuel gas is supplied from a fuel tank to an anode of a fuel cell, air serving as an oxidant gas is supplied via pressurization to a cathode thereof, and an electrochemical reaction is made to occur between the fuel gas and the oxidant gas, thereby generating an electromotive force.

From among such fuel cell systems, vehicle-mounted fuel cell systems are each mainly constituted by a fuel cell, a secondary battery, a driving motor and an auxiliary apparatus, and are operated by appropriately controlling the power distribution of these components.

Such fuel cell systems include a fuel cell system in which the SOC (remaining capacity) of a secondary battery is controlled to fall within a predetermined range by balancing power required to be generated which is determined based on, e.g., the degree of opening of an accelerator, regenerative power from a driving motor, and power generated from a fuel cell (see, e.g., Patent Document 1).

Patent Document 1: WO2002/015316 pamphlet

DISCLOSURE OF THE INVENTION

Problem to be Solved by the Invention

In fuel cell systems, carrying out a high-potential prevention control that avoids a voltage of a fuel cell becoming equal to or higher than a predetermined threshold under a predetermined condition in order to avoid the advancement of deterioration of the fuel cell has already been thought of. During such a high-potential prevention control, even if the issue of a power generation command has been stopped with respect to the fuel cell, the fuel cell might generate electric power, which leads to an error between a power generation command value and an actual electric power generated in the fuel cell.

In the state where such an error has occurred, a suitable power distribution cannot be provided, which might cause, for example, overcharge in the secondary battery.

An object of the present invention is to provide a fuel cell system capable of providing a suitable power distribution.

Means for Solving the Problems

The present invention provides a fuel cell system including: a fuel cell that generates electric power through an electrochemical reaction between a fuel gas and an oxidant gas; a motor that can be driven upon a supply of electric power and can generate regenerative power; a power storage unit which is connected in parallel with the fuel cell with respect to the motor and which can charge the motor with power generated from the fuel cell and regenerative power of the motor and can discharge charge power to the motor; an auxiliary apparatus that is used for operating at least the fuel cell; and a control unit that controls a power distribution between the fuel cell, the power storage unit, the motor and the auxiliary apparatus, in which the control unit determines the power distribution using a power generation command value based on power required to be generated during a normal operation, while the control unit determines the power distribution using a power generation measured value of the fuel cell instead of the power generation command value during a high-potential prevention control that avoids a voltage of the fuel cell becoming equal to or higher than a predetermined high-potential prevention voltage threshold lower than an open circuit voltage of the fuel cell.

With such a configuration, during the high-potential prevention control that avoids the output voltage of the fuel cell becoming equal to or higher than the predetermined high-potential prevention voltage threshold, even if the fuel cell generates electric power even though the issue of the power generation command to the fuel cell has been stopped, leading to an error between the power generation command value and the actual generated power of the fuel cell, the power distribution is determined using the power generation measured value of the fuel cell instead of the power generation command value, and therefore, the power distribution can be attained suitably.

With the above configuration, when the control unit carries out the high-potential prevention control while operation of the fuel cell is stopped, the control unit may determine the power distribution using a power generation measured value of the fuel cell instead of the power generation command value.

Also, when the control unit carries out the high-potential prevention control while the power generation command value is zero, the control unit may determine the power distribution using a power generation measured value of the fuel cell instead of the power generation command value.

EFFECT OF THE INVENTION

According to the fuel cell system of the invention, a suitable power distribution can be provided, thereby avoiding, for example, overcharge of a power storage unit.

BRIEF DESCRIPTION OF THE DRAWINGS

FIG. 2 is a flowchart showing an example of processing of high-potential prevention control carried out when an intermittent operation is required in the fuel cell system.

BEST MODE FOR CARRYING OUT THE INVENTION

Figure 1:
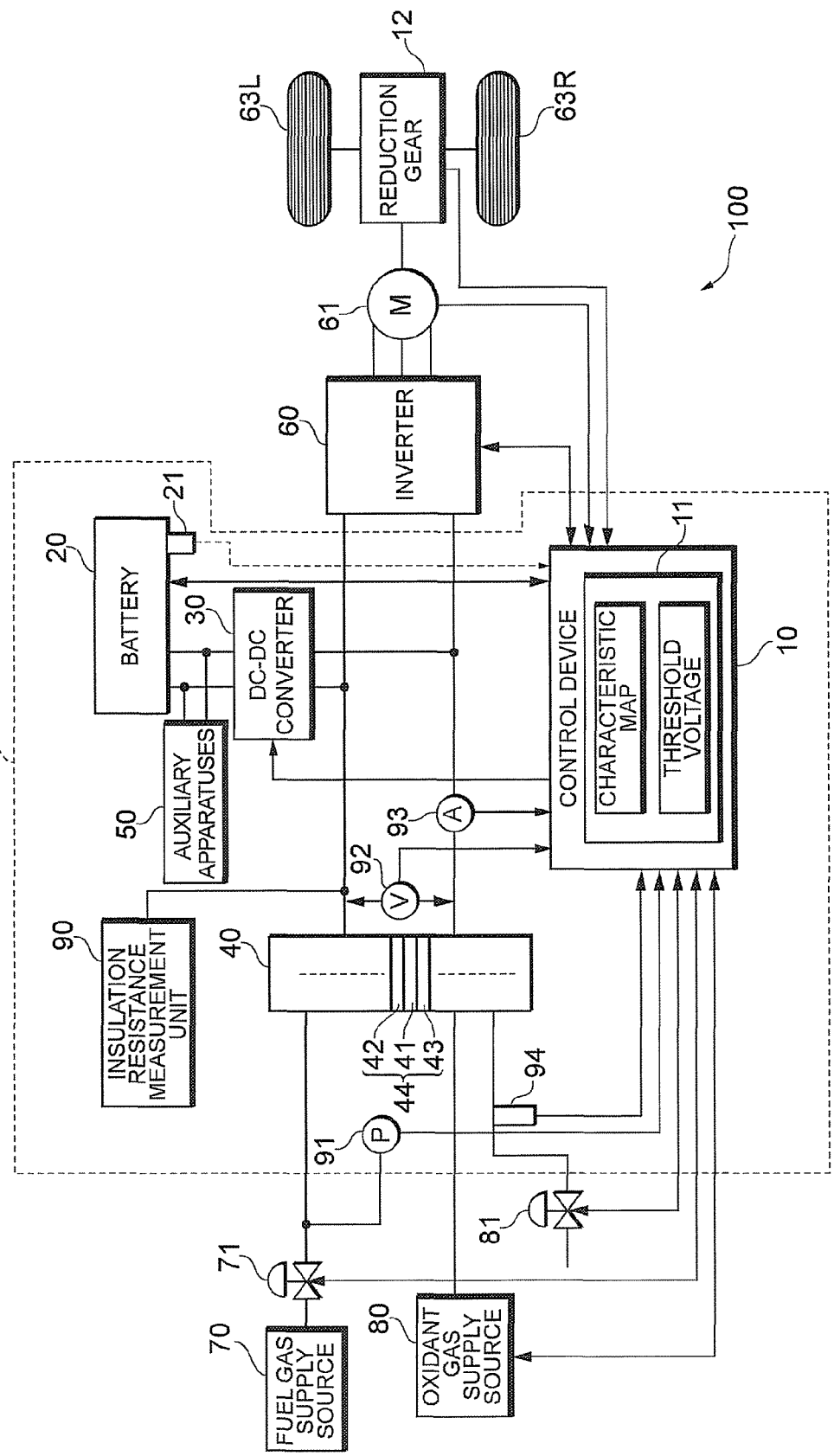
FIG. 1 is a system configuration diagram schematically illustrating a fuel cell system according to an embodiment of the invention.

Now, an embodiment according to the present invention will be described with reference to the attached drawings.

FIG. 1 is a diagram showing a primary configuration in a fuel cell system 100 according to this embodiment.

This embodiment assumes fuel cell systems mounted on vehicles such as fuel cell hybrid vehicles (FCHV), electric vehicles and hybrid vehicles, but the fuel cell systems may be applied not only to the vehicles but also to various mobile objects (e.g., two-wheel vehicles, ships, airplanes and robots). Furthermore, not only the fuel cell systems mounted on mobile objects but also stationary fuel cell systems and portable fuel cell systems may be employed.

The above vehicle drives with a traction motor 61, serving as a driving force source, which is connected to wheels 63L and 63R through a reduction gear 12. A power supply of the traction motor 61 is a power supply system 1. A direct current output from the power supply system 1 is converted into a three-phase alternating current by an inverter 60, and is supplied to the traction motor 61. The traction motor 61 can function also as a power generator during braking. The power supply system 1 is constituted by a fuel cell 40, a battery (power storage unit) 20, a DC/DC converter 30, etc.

The fuel cell 40 is a means for generating electric power from supplied reaction gases (fuel gas and oxidant gas), and various types of fuel cells such as polymer electrolyte fuel cells, phosphoric acid fuel cells and molten carbonate fuel cells may be used. The fuel cell 40 includes a polymer electrolyte membrane 41 constituted by, e.g., a proton conducting ion-exchange membrane made of, e.g., fluororesin, and a platinum catalyst (electrode catalyst) is applied onto a surface of the polymer electrolyte membrane.

The catalyst applied onto the polymer electrolyte membrane 41 is not limited to the platinum catalyst, and a platinum-cobalt catalyst (hereinafter simply referred to as catalyst), etc., may also be employed. Each of the cells constituting the fuel cell 40 includes a membrane electrode assembly 44 in which an anode 42 and a cathode 43 are formed through, e.g., screen printing, on both the surfaces of the polymer electrolyte membrane 41. The fuel cell 40 has a stack structure in which a plurality of unit cells is stacked in series.

An output voltage (hereinafter referred to as FC voltage) and an output current (hereinafter referred to as FC current) of the fuel cell 40 are respectively detected by a voltage sensor 92 and a current sensor 93. While a fuel gas such as a hydrogen gas is supplied from a fuel gas supply source 70 to a fuel electrode (anode) of the fuel cell 40, an oxidant gas such as air is supplied from an oxidant gas supply source 80 to an oxygen electrode (cathode) thereof.

The fuel gas supply source 70 is constituted by a hydrogen tank, various valves, etc., and an amount of the fuel gas to be supplied to the fuel cell 40 is controlled by adjusting the degree of opening, ON/OFF time, etc.

The oxidant gas supply source 80 is constituted by an air compressor, a motor for driving the air compressor, an inverter, etc., and an amount of the oxidant gas to be supplied to the fuel cell 40 is adjusted by adjusting, e.g., the revolution speed of the motor.

The battery 20 is a chargeable and dischargeable secondary battery and constituted by a nickel-hydrogen battery, etc. Obviously, any chargeable and dischargeable capacitor (e.g., capacitor) other than the secondary battery may be provided instead of the battery 20. The battery 20 is inserted into a discharge path of the fuel cell 40 and is connected in parallel with the fuel cell 40. The battery 20 and the fuel cell 40 are connected in parallel with the inverter 60 for the traction motor, and the DC/DC converter 30 is provided between the battery 20 and the inverter 60.

The inverter 60 is a pulse width modulation-type (PWM) inverter constituted by, for example, a plurality of switching elements, and the inverter 60 transforms a direct-current power output from the fuel cell 40 or the battery 20 to a three-phase AC power in accordance with a control command given from a control device 10, and supplies the three-phase AC power to the traction motor 61. The traction motor 61 is a motor for driving the wheels 63L and 63R, and the revolution speed of the motor is controlled by the inverter 60.

The DC/DC converter 30 is a full-bridge converter which includes, for example, four power transistors and a dedicated drive circuit (each not shown). The DC/DC converter 30 has: the function of increasing or decreasing the DC voltage input from the battery 20 and then outputting the DC voltage toward the fuel cell 40; and the function of increasing or decreasing the DC voltage input from the fuel cell 40, etc., and then outputting the DC voltage toward the battery 20. These functions of the DC/DC converter 30 charge and discharge the battery 20.

Provided between the battery 20 and the DC/DC converter 30 are auxiliary apparatuses 50 such as a vehicle auxiliary apparatus and an FC auxiliary apparatus. The battery 20 serves as a power supply of these auxiliary apparatuses 50. Note that the vehicle auxiliary apparatus refers to various types of electrical equipment used during the operation of the vehicle (e.g., lighting equipment, air conditioner and hydraulic pump), while the FC auxiliary apparatus refers to various types of electrical equipment used for the operation of the fuel cell 40 (e.g., air compressors and pumps used for the supply of the fuel gas and the oxidant gas).

Further, an insulation resistance measurement unit 90 is connected to wiring that leads to the fuel cell 40. The insulation resistance measurement unit 90 measures an insulation resistance between the fuel cell 40 and a vehicle body.

The operations of the above-described components are controlled by the control device (control unit) 10. The control device 10 is configured as a microcomputer provided therein with a CPU, ROM and RAM.

The control device 10 controls the units in the system such as a pressure regulating valve 71 provided in a fuel gas path, a pressure regulating valve 81 provided in an oxidant gas path, the fuel gas supply source 70, the oxidant gas supply source 80, the battery 20, the DC/DC converter 30 and the inverter 60 in accordance with input sensor signals.

The control device 10 receives inputs of various sensor signals on, e.g., a supply pressure of the fuel gas which is detected by a pressure sensor 91, an FC voltage of the fuel cell 40 which is detected by a voltage sensor 92, an FC current of the fuel cell 40 which is detected by a current sensor 93, an SOC (State Of Charge) value representing the SOC of the battery 20 which is detected by an SOC sensor 21.

In this embodiment, even when limitations are put on an amount of charge of the battery 20, for example, the switching frequency of the DC/DC converter 30 is raised, while the energy loss of the DC/DC converter is increased, thereby reliably avoiding the voltage of the fuel cell 40 becoming equal to or higher than a predetermined high-potential prevention voltage threshold below an open circuit voltage of the fuel cell 40.

Next, high-potential prevention control processing performed by the control unit 10 when an intermittent operation is required will be described with reference to FIG. 2.

The control device 10 calculates electric power required from the fuel cell 40 (power required to be generated) (step S1). This calculation of required power is performed in consideration of, for example, electric power consumed for driving the traction motor 61 and the auxiliary apparatuses 50, regenerative power of the traction motor 61 and power supplied by the battery 20.

The control device 10 then calculates an output voltage of the fuel cell 40 in accordance with the required power using a not-shown characteristic map showing I-V characteristics and I-P characteristics (step S3). This characteristic map is obtained in advance through, e.g., experiments, and is stored in internal memory 11 in the control device 10 at the time of, e.g., shipment after manufacturing. Note that values of the characteristic map may be fixed values, or may also be sequentially rewritable values.

The control device 10 then judges whether or not an output voltage of the fuel cell 40 needs to be forced to be decreased (step S5). More specifically, the control device 10 compares the output voltage with a high-potential prevention target threshold voltage (hereinafter threshold voltage Vth), and determines that the output voltage of the fuel cell 40 needs to be forced to be decreased when the output voltage exceeds the threshold voltage Vth. On the other hand, when the output voltage is equal to or lower than the threshold voltage Vth, the control device 10 determines that the output voltage of the fuel cell 40 does not need to be forced to be decreased.

The threshold voltage Vth is a voltage lower than the open circuit voltage of the fuel cell 40, and is obtained in advance through, e.g., experiments, and stored in the internal memory 11 of the control device 10 at the time of, e.g., shipment after manufacturing. The threshold voltage Vth may have a fixed value, and may also have a sequentially rewritable value in accordance with, e.g., a surrounding environment (outdoor air temperature, fuel cell temperature, humidity, operation mode, etc.).

When the control device 10 determines in the above judgment that the output voltage of the fuel cell 40 does not need to be forced to be decreased (step S5: NO), the control device 10 ends the high-potential prevention processing since a control that avoids a high-potential state of the fuel cell 40 is unnecessary.

On the other hand, when the control device 10 determines in the above judgment that the output voltage of the fuel cell 40 needs to be forced to be decreased (step S5: YES), the control device 10 performs a control to force the output voltage of the fuel cell 40 to be decreased to a value below the threshold voltage Vth (step S7). At this point, to which value the output voltage of the fuel cell 40 is forced to be decreased may be set arbitrarily.

The control device 10 then judges whether or not surplus power can be absorbed in the battery 20 (i.e., whether or not the surplus power can be stored in the battery 20) (step S9). More specifically, the control device 10 judges whether or not the surplus power can be absorbed in the battery 20 by, for example, obtaining the SOC value detected by the SOC sensor 21 and checking an amount of remaining power in the battery 20.

When the control device 10 determines that the surplus power can be absorbed in the battery 20 (step S9: YES), the control device 10 has the surplus power absorbed in the battery 20 (has the surplus power stored in the battery 20) (step S11), and then ends the processing. On the other hand, when the control device 10 determines that the surplus power cannot be absorbed in the battery 20 (step S9: NO), the control device 10 has the surplus power P absorbed by, for example setting the switching frequency of the DC/DC converter 30 high to increase energy loss of the DC/DC converter 30 (step S13), and then ends the processing.

In addition to the above-described high-potential prevention control processing, the control device 10 in this embodiment carries out a power distribution control between the fuel cell 40, the battery 20, the traction motor 61 and the auxiliary apparatuses 50. In this power distribution control, the control device 10 computes regeneration permitting power that permits regeneration of the traction motor 61, as described below.

During the execution of a normal power generation mode, power that permits regeneration of the traction motor 61, i.e., motor-regeneration permitting power, in a power distribution is computed as shown below on the basis of charge permitting power that permits charge of the battery 20 and a power generation command value based on power required to be generated, i.e., FC command power.

Motor-regeneration permitting power=charge permitting power+*FC* command power

Here, the charge permitting power is computed as shown below on the basis of power with which the battery 20 can be charged, i.e., chargeable power of the battery; loss (power consumption) caused by the auxiliary apparatuses 50, i.e., auxiliary-apparatus loss (auxiliary-apparatus power consumption); and an efficiency of the DC/DC converter 30, i.e., a converter efficiency.

Charge permitting power=(chargeable power of the battery+auxiliary-apparatus loss)×(1/converter efficiency).

From the above, during the execution of the normal power generation mode, the power generation command value based on power required to be generated, i.e., FC command power, is used to determine the power distribution.

On the other hand, during the execution of high-potential prevention control in an intermittent operation mode, a command power value for the fuel cell 40 is zero since the system is in an output stop state. Nevertheless, the output voltage of the fuel cell 40 is forced to be decreased to a value below the threshold voltage Vth, and as a result, the fuel cell 40 generates electric power. Accordingly, a need arises for preventing the traction motor 61 from regenerating power that exceeds the charge permitting power for the battery 20.

In light of this, in the output stop mode, the motor regeneration permitting power is computed using an FC power generation measured value, being the power generation measured value of the fuel cell 40, instead of the FC command power. More specifically, during the high-potential prevention control, the following computation is performed using the FC power generation measured value, being the power generation measured value of the fuel cell 40, only in the output stop state, thereby establishing the power distribution between the fuel cell 40, the battery 20, the traction motor 61 and the auxiliary apparatuses 50.

Motor-regeneration permitting power=charge permitting power+*FC* power generation measured value In accordance with the fuel cell system 100 according to the above-described embodiment, during the high-potential prevention control that avoids the voltage of the fuel cell 40 becoming equal to or higher than the predetermined threshold voltage Vth, even if the fuel cell 40 generates electric power even though the issue of the power generation command to the fuel cell 40 has been stopped, leading to the error between the power generation command value and the actual power generated by the fuel cell 40, the control device 10 determines the power distribution using the power generation measured value of the fuel cell 40 instead of the FC command value, and therefore, the suitable power distribution can be provided. Accordingly, the overcharge caused in the battery 20, etc., can be avoided.

What is claimed is:
1. A fuel cell system comprising:
a fuel cell that generates electric power through an electrochemical reaction between a fuel gas and an oxidant gas;
a motor that can be driven upon a supply of electric power and can generate regenerative power;

a power storage unit which is connected in parallel with the fuel cell with respect to the motor and which can be charged with power generated from the fuel cell and regenerative power of the motor and can discharge charge power to the motor;

an auxiliary apparatus that is used for operating at least the fuel cell;

a control unit that is programmed to control a power distribution between the fuel cell, the power storage unit, the motor and the auxiliary apparatus, a power generation command value determined by the control unit and based on power required to be generated during a normal power generation mode;

a power generation measured value of the fuel cell;

a predetermined high potential prevention voltage threshold lower than an open circuit voltage of the fuel cell; wherein the predetermined high potential prevention voltage threshold is stored in an internal memory of the control unit;

wherein the control unit is further programmed to compare a fuel cell output voltage with the high-potential prevention target threshold voltage; wherein the control unit is further programmed to switch from the normal power generation mode computation to an intermittent operation mode computation if the fuel cell output voltage exceeds the high-potential prevention target threshold voltage; wherein the control unit is further programmed to distribute power in the intermittent operation mode by using the power generation measured value of the fuel cell instead of the power generation command value in order to maintain the fuel cell output voltage below the predetermined high potential prevention voltage threshold.

2. The fuel cell system according to claim 1, wherein the control unit is programmed to determine the power distribution using the power generation measured value of the fuel cell instead of the power generation command value when operation of the fuel cell is stopped.

3. The fuel cell system according to claim 1, wherein the control unit is programmed to determine the power distribution using the power generation measured value of the fuel cell instead of the power generation command value when the power generation command value is zero.

* * * * *